United States Patent [19]

Gottfried

[11] Patent Number: 4,460,834
[45] Date of Patent: Jul. 17, 1984

[54] UNINTERRUPTIBLE POWER SYSTEM

[75] Inventor: Carlos F. Gottfried, Mexico City, Mexico

[73] Assignee: Power Group International Corp., Houston, Tex.

[21] Appl. No.: 527,264

[22] Filed: Aug. 29, 1983

[51] Int. Cl.³ .......................... H02P 9/42; H02J 9/06
[52] U.S. Cl. .......................................... 307/64; 307/68; 307/84; 290/4 R; 290/4 C; 290/30 R; 290/30 A; 322/9
[58] Field of Search ................. 307/64, 68, 84, 87; 290/4 R, 4 B, 30 R, 30 A; 322/9

[56] References Cited

U.S. PATENT DOCUMENTS

| | | | |
|---|---|---|---|
| 2,688,704 | 9/1954 | Christenson | 290/4 C |
| 3,221,172 | 11/1965 | Rolison | 290/4 R |
| 3,305,762 | 2/1967 | Geib, Jr. | 322/4 |
| 3,458,710 | 7/1969 | Dodge | 290/4 R |
| 3,477,013 | 11/1969 | Smith | 290/4 R X |
| 3,810,116 | 5/1974 | Prohofsky | 364/200 |
| 4,406,950 | 9/1983 | Roesel, Jr. | 307/68 X |
| 4,412,170 | 10/1983 | Roesel, Jr. | 307/64 X |

Primary Examiner—E. A. Goldberg
Assistant Examiner—Derek Jennings
Attorney, Agent, or Firm—Dula, Shields & Egbert

[57] ABSTRACT

The present device is power system for providing an uninterruptible power supply to an external load comprising a flywheel generator, a first motor, a standby generator, and a transfer controller. The flywheel generator is adapted to supply energy to the external load. The first motor is drivingly connected to the flywheel generator. The first motor is adapted to be connected to a source of power external to the power system. The standby generator is electrically connected to the first motor. A standby motor is drivingly connected to the standby generator. The transfer controller is adapted to switchably interconnect the first motor to the source of power and to interconnect the standby generator to the first motor. The flywheel generator comprises a flywheel having a vertical axis, a shaft connected to the flywheel, and a synchronous A.C. generator arranged about the shaft. The standby motor is a diesel engine having an electric starter. A voltage regulator is electrically connected about the output of the flywheel generator.

20 Claims, 1 Drawing Figure

UNINTERRUPTIBLE POWER SYSTEM

FIELD OF THE INVENTION

The present invention relates to uninterruptible power systems. In particular, this invention relates to no-break power supplies that keep an external load electrically isolated from the utility power supply while assuring adequate power to the external load.

BACKGROUND ART

It is customary in situations of critical electrical power requirements to provide an auxillary power source which can be switched to and from the load in the event of commercial power failure or excessive power variations. In some situations, however, the criticality of the load is such that interruptions or variations in power caused by such switching, although slight, cannot be tolerated. For example, during the countdown period prior to launch of a space vehicle, it is very important that the power supplying the load to the various computers and data equipment be uninterrupted. Typically, computer systems require a constant power supply. Interruptions in the power supply can erase memory and injure the software and hardware of the computer. Other situations where uninterruptible power supplies are consider important include: automatic banking services, automatic industrial processes, communication and signaling centers for maritime and aerial transportation, radio and television stations, and various emergency and security services.

Commercial power alone is generally not considered sufficiently reliable as a sole source of power for such usages. Interruptions commonly occur and loads may vary as other users come on and off the commercial power line. These problems are enhanced in the lesser developed countries where power systems are only in the initial stage of development.

Uninterruptible power systems are generally known within the prior art. Such uninterruptible power supplies usually comprise a generator and two prime movers, one of which normally drives the generator, and the other normally being stationary. When the normally operating prime mover ceases to function for any reason, the normally stationary prime mover is brought up to speed and is connected to drive the generator, usually through a clutch, thereby insuring a continuous supply of current from the generator. Commonly, a kinetic energy supply and device such as a flywheel or a D.C. dynamoelectric machine is coupled to the generator and supplies energy thereto during the transitional period when the generator load is being transferred from one prime mover to the other. One prior art type of no-break power supply comprises an internal combustion engine adapted to be connected through a normally disengaged clutch to a flywheel, the flywheel being connected in turn to the rotor of an electric generator which in turn is connected to the rotor of an A.C. motor. Another prior art type of no-break power supply employs a D.C. dynamoelectric machine in place of the flywheel, both of these devices acting to supply kinetic energy during the aforementioned transitional period.

In the operation of a prior art no-break power supply of either of the aforementioned types, the generator and kinetic energy supplying device are normally driven by the A.C. motor. When there is a failure of the A.C. motor, as, for example, may be caused by an interruption in the power supplied to the A.C. motor, the internal combustion engine is started automatically, brought up to speed, and the clutch is then engaged. The internal combustion engine then drives the generator. During the transitional period when the load is being shifted from one prime mover to the other, the kinetic energy of the flywheel or D.C. machine is utilized to maintain the rotation of the generator.

The prior art shows the number of patented devices that supply uninterruptible power to an external load. U.S. Pat. No. 2,688,704 describes a motor-generator-engine assemblage arranged so as to provide a constant source of electrical power. This device employs a clutch as the switching arrangement. U.S. Pat. No. 3,221,172 is a no-brake power supply employing a differential between the primary motor and the standby motor. U.S. Pat. No. 3,305,762 discloses an improved method for maintaining the supply of electrical energy to a load during an interruption of the normal supply of electrical power. This device employs a clutch of the eddy current type. U.S. Pat. No. 3,458,710 is an emergency power system providing an uninterrupted power source having an electric generator for supplying energy to a load, a first motor adapted to be connected to a source of power external as a power system, and a second motor for driving the generator. This system also provides an auxilliary generator driven by a diesel engine for supplying the second motor through a relay connection. Finally, U.S. Pat. No. 3,810,116 relates to systems for capturing the information stored in a volatile semiconductor memory during the loss of electric power.

Typically, these prior art uninterruptible power supplies have a number of disadvantages. In certain devices, the clutch or differential is a weak mechanical link in the system and from time to time requires replacement. Generally speaking, the internal combustion engine, clutch, flywheel, a generator, and A.C. motor must be mounted end-to-end with their respective shafts coupled together. This creates a power supply of considerable physical length which can be difficult to install in a small area. Auxilliary controls must be provided to start the internal combustion engine, to bring it up to speed, and to engage the generator at the proper time. Many of the prior art devices do not operate as load isolators from the power line during normal operations. As a result, fluctuations in electrical power, such as brownouts, would continue to affect the external load.

It is an object of the present invention to provide an uninterruptible power system that responds simultaneously to utility power supply failures or faults and without any adverse effect on the load.

It is another object of the present invention to provide an uninterruptible power system in which any component of the system can be conveniently separated from the others.

It is another object of the present invention to provide an uninterruptible power system that has a vertically mounted flywheel for greater safety and less susceptibility to earthquakes.

It is another object of the present invention to provide an uninterruptible power system that isolates the external load from the utility power system during normal operation.

It is still another object of the present invention to provide an uninterruptible power system having low initial and maintenance costs.

It is still a further object of the present invention to provide an uninterruptible power system that does not use a clutch-type switching system.

It is yet another advantage of the present invention to provide an uninterruptible power system that functions as an automatic voltage regulator.

These and other objects and advantages of the present invention will become apparent from a reading of the attached Specification and appended Claims.

DISCLOSURE OF THE INVENTION

The present invention is a power system for providing an uninterruptible power supply to an external load comprising a first generator adapted to supply energy to the external load, a first motor adapted to be connected to a source of power external to the power system, a standby generator electrically connected to the first motor, and a standby motor drivingly connected to the standby generator. The first motor is drivingly connected to the first generator. The standby motor is responsive to interruptions in the source of power external to the system. The power system also includes a transfer controller adapted to interconnect the first motor to the source of power and to interconnect the standby generator and the standby motor to the first motor. The transfer controller causes the standby motor to respond to interruptions in the source of power. The transfer controller also is adapted to cause the first motor to receive power from the standby generator and cause the first motor to be disconnected from the source of power. The transfer controller also includes a detector for sensing the interruptions in the source of power.

The flywheel generator comprises a flywheel having a vertical axis, a shaft connected to that vertical axis, and a synchronous A.C. generator arranged about the shaft. The first generator, first motor, and the flywheel are arranged within a single housing about a common vertical shaft.

The first motor is a three-phase A.C. induction motor. The standby motor comprises an internal combustion engine having an electric starter. The electric starter is connected to the transfer controller. The standby generator is a three-phase, synchronous A.C. generator.

The power system further includes a voltage regulator electrically connected about the output of the first generator for maintaining the desired voltage to the external load. The external load is isolated from the source of power external to the power system. The external load is powered solely by the flywheel generator.

BEST MODE FOR CARRYING OUT THE INVENTION

Figure 1:
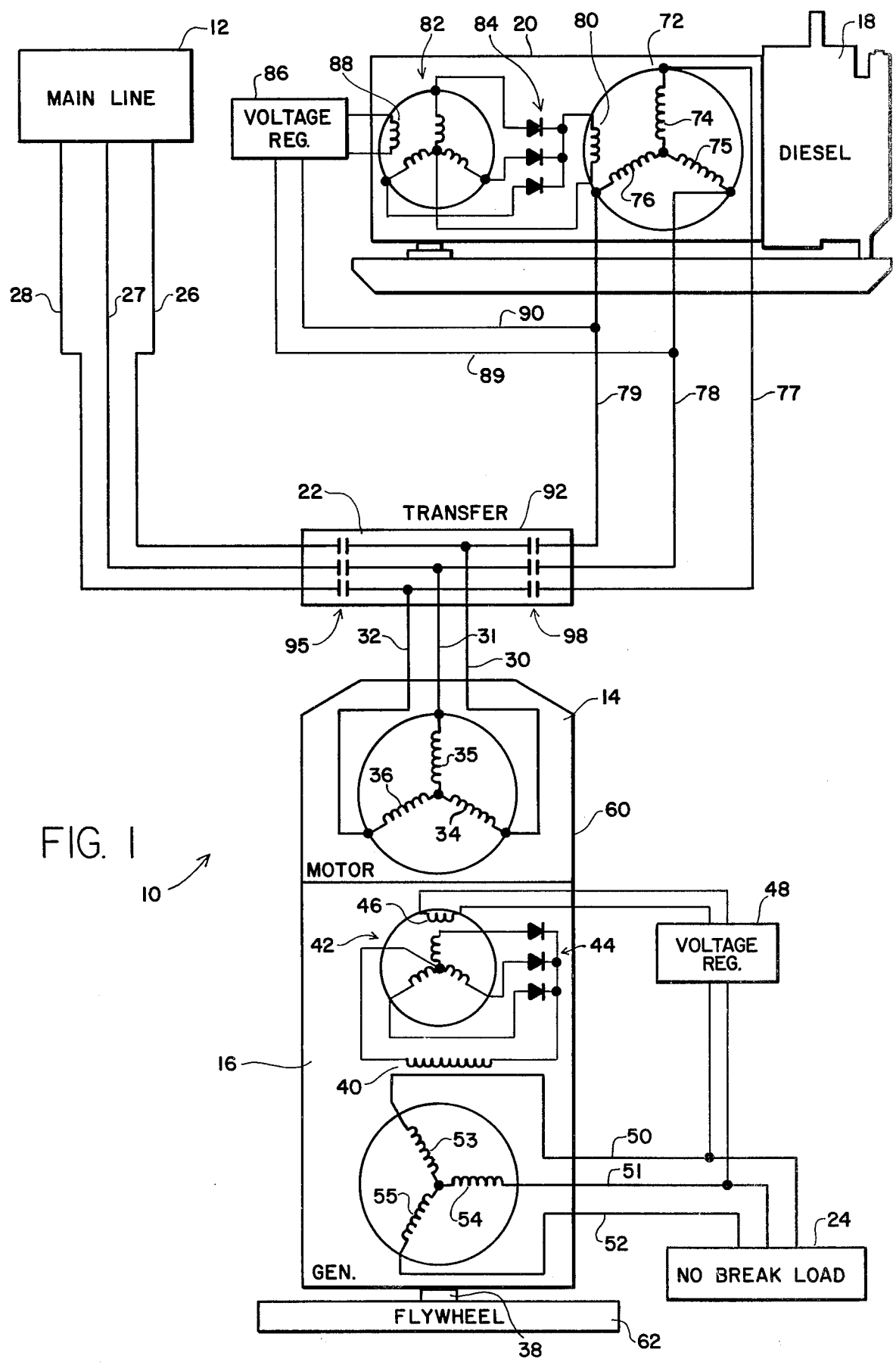
FIG. 1 is a schematical representation of the uninterruptible power system according to the present invention.

Referring to FIG. 1, there is shown at 10 the uninterruptible power system according to the present invention. Specifically, uninterruptible power system 10 includes external power source 12, first motor 14, first generator 16, standby engine 18, standby generator 20, and transfer controller 22. Each of these components are arranged and adapted so as to provide an uninterruptible supply to external load 24.

External power source 12 is a utility power line. This utility power line supplies the system with typically three-phase 230 volts A.C. External power source 12 receives its power from utility power company. This power is passed from the utility company to the uninterruptible power system of the present invention through lines 26, 27 and 28.

First motor 14 is connected to lines 26, 27, 28 through lines 30, 31, 32, respectively. These lines are connected within transfer controller 22. In this manner, first motor 14 is adapted to receive power from the external power source 12. First motor 14 is a three-phase induction squirrel cage A.C. motor. This motor 14 has high torque, low slip, re-enforced windings, N.E.M.A. class F insulation and reconnectable terminals for different line voltages. Lines 30, 31, and 32 are connected to motor 14 by stator windings 34, 35, and 36, respectively. Through this arrangement, the external power source 12 causes induction motor 14 to create torque on shaft 38. This operation is described hereinafter.

First generator 16 is a synchronous, three-phase A.C. generator. Generator 16 has high frequency rectified excitation. It is brushless, has reinforced windings, N.E.M.A. class F insulation, and reconnectable terminals. As illustrated, generator 16 supplies, under both normal and power-continuing conditions, a single or three-phase load. The field 40 of the generator receives power from an exciter 42. The rotor winding is connected through conventional rectifiers 44 to the field winding 40 of generator 16. The exciter 42 has a field winding 46 which receives power from generator 16 under the control of a conventional voltage regulator 48. Generator 16 and exciter 42 are conventional brushless units, the rotors of both machines being mounted on the same shaft 38. The rectifiers 44 are carried, though not shown, on a support which also rotates with shaft 38.

Regulator 48 acts to increase or decrease the excitation of exciter field winding 46 to the degree needed to maintain the output voltage at a desired value. Once generator 16 obtains substantially rated speed, regulator 48 is able to sufficiently influence the excitation of generator 16 to maintain the output voltage of the latter at substantially the desired value. The output voltage of generator 16 is passed through the external load through lines 50, 51, and 52. Lines 50, 51, and 52 connect with stator winding 53, 54, and 55 of generator 16, respectively. Voltage regulator 48 is connected to line 50 and 51.

Motor 14 and generator 16 are arranged within a single vertical housing 60. Housing 60 includes a housing skirt arranged about the flywheel. Flywheel 62 is mounted to shaft 38. Flywheel 62 is free to rotate as needed. Shaft 38 is attached to the vertical axis of flywheel 62. Shaft 38 extends vertically upwardly from flywheel 62 into housing 60. Within housing 60, vertical shaft 38 is received and acted on by motor 14 and generator 16.

The standby generator of the uninterruptible power system of the present invention comprises standby engine 18 and standby generator 20. Standby engine 18 is of the diesel type normally having a water cooled radiator, a water preheater, along with low oil pressure and high water temperature protection. Diesel engine 18 is automatically speed regulated. Generator 20 has stator windings 74, 75, and 76. Stator windings 74, 75, and 76 are connected to lines 77, 78, and 79, respectively. Lines 77, 78, and 79 extend from the generator 20 to transfer controller 22. Lines 77, 78, and 79 are positioned within transfer controller 22 so as to be in switchable position relative to lines 30, 31, and 32 of first motor 14.

Standby generator 20 is of a type similar to that of first generator 16. Specifically, generator 20 includes field 80 and exciter 82. Conventional diodes 84 are arranged with respect to the armature windings of exciter 82. A voltage regulator 86 is connected to field winding 88. Voltage regulator 86 is of the conventional variety. Voltage regulator 86 is connected to lines 78 and 79 through lines 89 and 90, respectively. Voltage regulator 86 serves to maintain the voltage generated by generator 20 at a desired level. Field winding 80 and stator winding 72 serve to transmit sufficient motive power to assist in the rapid acceleration of diesel engine 18 during start up after a line power interruption.

Transfer controller 22 is adapted so as to receive lines 26, 27, and 28 from external power source 12; to receive lines 30, 31, and 32 from first motor 14; and to receive lines 77, 78, and 79 from standby motor 18. These lines are arranged within transfer controller 22 so as to allow the controller to change current sources as necessary to maintain the continuous flow of power to external load 24. Transfer controller 22 includes metering equipment for voltage, current, frequency, generator voltage regulators, magnetic contactors and relays, a manual three-phase circuit breaker, indicator lights for normal and abnormal operation, an elapsed hours meter, and an enclosure 92. The operation of transfer controller 22 in conjunction with interruptions or outages of power from external power source 12 is described hereinafter.

The operation of the present invention is as follows. Initially, contactor 95 within the transfer controller 22 is closed so as to allow the power to pass from the external power source 12 to the first motor 14. In this manner, the utility line supplies normal running power to the A.C. induction motor 14. Induction motor 14 causes the common shaft 38 (and associated major parts, motor rotor, generator rotors and flywheel) to constantly spin at or close to synchronous speed (typically 50 or 60 Hz). The spinning of the shaft 38 causes generator 16 to supply power to the external load 24. The power passes from generator 16 through lines 50, 51, and 52 to the external load 24. External load 24 is any device that requires uninterruptible constant power. This can include computers, communications equipment, warning devices, et cetera. Generator 16 is the only source of power to the load. The main utility line associated with the external power source 12 is isolated from the external load 24. As long as the flywheel rotates at, or close to, synchronous speed, and the generator continues to produce the power, as required by the external load, a continuous supply of power is achieved.

During this normal operation, standby engine 18 is maintained in full readiness. In other words, the engine 18 is preheated with a thermostat controlled heater. Diesel lines are purged and full of fuel. In addition, the battery for the engine starter motor is fully charged. The standby system will only come into operation upon an interruption in the power provided by the external power source 12.

When a power failure occurs, the following sequence of events will occur so as to maintain the continuous power to the external load 24. Initially, the power from external power source 12 is interrupted or completely stopped. This may be either a "brownout" (low voltage), a missing phase, or a blackout (total interruption). Transfer controller 22 opens contactor 95 so as to remove the first motor 14 from the external power source 12. Simultaneously, contactor 98 is closed so as to allow power to pass between motor 14 and the standby generator 20. When the power loss occurs, the flywheel associated with shaft 38 takes command as the prime mover in the system so as to continue generating power with generator 16 to the external load 24. The flywheel should have enough rotational momentum to continue to provide sufficient levels of power to the external load while the standby system becomes operational. The transfer controller has transferred the A.C. motor lines 30, 31, and 32 to the generator lines 77, 78, and 79 in the standby system. Simultaneously, the electric starter associated with diesel engine 18 is actuated. This causes the diesel engine 18 to start firing, the engine oil pressure to rise, and power to be generated. After the diesel engine 18 begins firing, the engine starter motor is disconnected.

When the standby engine 18 reaches ten percent of its normal operating speed, standby generator 20 begins producing a noticeable voltage. Because this voltage is being produced at a lower frequency than the induction motor 14, induction motor 14 will act as an induction generator and the synchronous generator 20 will act as a synchronous motor. During this condition, the normal roles of these two machines are reversed, thereby providing a unique clutching action. The strength of the motorizing torque effect is due to the differences in frequencies and voltage. This voltage, in turn, is proportional to the speed of the standby generator 20.

As the speed increases in the standby generator 20, the motorizing torque also increases. The net effect is an extremely smooth but powerful clutch which increases the acceleration of the standby generator 20 without severe mechanical strain or shock to the internal combustion engine 18.

When the standby generator 20 reaches the same speed as the induction motor 14, the roles of induction motor 14 and synchronous generator 16 revert to their normal function. At this time, the flywheel ceases to be the prime mover for providing power to the external load 24. The standby generator system then becomes the prime mover for operating motor 14 and rotating the shaft 38 and associated parts (flywheel). Since the flywheel has lost a bit of rotational momentum (speed) during the process of transferring power sources, the standby generator acts on motor 14 so as to gradually accelerate the flywheel and associated generator 16 back to its normal speed. It should be noted that the flywheel delivers full and continuous power within established frequency tolerances during the power transfer. Both the deacceleration and reacceleration of the flywheel is accomplished at what is considered slow slew rates within allowable frequency limits.

After a pre-determined time following the return of power to the external power source 12, the transfer controller 22 will transfer the motor line from the motor 14 to the lines associated with external power source 12. The transfer controller 22 will also shut down the engine 18 of the standby system. This completes the main line failure cycle and returns the power system 10 to its normal running operation.

The initial start-up of the uninterruptible power system 10 of the present invention is a manually controlled operation. The objective in the start-up is to accelerate the flywheel of generator 16 from a standstill to its synchronous speed. This is done by electrically connecting the motor 14 to the generator 20 of the standby system. The diesel engine 18 is manually actuated and accelerated. Power is produced by standby generator 20. This power, in turn, gradually accelerates the shaft 38 and the flywheel through motor 14. Once the proper speed of the flywheel is reached, the "manual" mode in the transfer controller 22 is switched over to "automatic" such that the transfer controller 22 takes command of normal and automatic transfer operations.

The present invention offers a number of advantages not found in prior uninterruptible power systems. The uninterruptible power systems generally seen today are based on static type electronic rectifier components and circuitry working in conjunction with a battery bank of limited duration. The present invention does not have an operating time limit as do batteries nor does it require high technology personnel and parts for installation, servicing or operation. Since no mechanical clutching mechanism is utilized in the present invention, the internal combustion engine is not subject to severe strain or wear. As a result, standard industrial or automotive engines may be used without the need to be reinforced or redesigned. In addition, the life and reliability of the engine will be much greater. Since there are no mechanical parts to wear in the clutch mechanism, there are no parts to replace or maintain. Any "clutching" that occurs in the present invention is a result of the electromagnetic components of the system.

The components of the present invention are electrically connected. Therefore, any component of the system can be conveniently separated from the other components of the system. This adds to flexibility and economy in locating the device.

Since many of the power systems of the lesser developed countries are either unstable or inadequate, the present invention eliminates many of the problems that can be encountered from blackouts and brownouts. As is mentioned previously, the external load is electrically isolated from the utility power line during the normal operation of the system. This prevents losses of computer memory and other data caused by utility line interruption, interference, or stoppage. It avoids the losses and stoppage of important electric and electronic apparatus. Since the power to the external load is isolated, the present invention further protects against disturbances caused by the switching from the utility line to the emergency system.

The cost of the present uninterruptible power system is considerably less than that of other systems. The components of the present invention are presently available at a relatively low cost. There is no added cost of purchasing battery banks, transformers, or intricate electronic equipment. Furthermore, the installation, maintenance, and operation of the equipment can be performed by persons having limited electric motor and generator experience.

The foregoing disclosure and description of the invention is illustrative and explanatory thereof, and various changes in the details of the illustrated apparatus may be made within the scope of the appended claims without departing from the true spirit of the invention. The present invention should only be limited by the following claims and their legal equivalent.

I claim:

1. A power system for providing an uninterruptible power supply to an external load comprising:

flywheel generator means adapted to supply energy to said external load;

first motor means adapted to be connected to a source of power external of said power system, said first motor means drivingly connected to said flywheel generator means, said flywheel generator means being electrically isolated from said source of power external of said power system;

standby generator means switchably electrically connected to said first motor means; and transfer control means adapted to switchably interconnect said first motor means to said source of power and to switchably interconnect said standby generator means to said first motor means, said transfer control means causing said standby generator means to respond to interruptions in said source of power.

2. The system of claim 1, said transfer control means adapted so as to cause said standby generator means to receive power from said first motor means and to cause said motor means to be disconnected from said source of power upon said interruptions in said source of power.

3. The system of claim 1, said transfer control means adapted so as to cause said first motor means to receive power from said standby generator means and to cause said first motor means to be disconnected from said source of power upon said interruptions in said source of power.

4. The system of claim 1, said flywheel generator means comprising a flywheel having a vertical axis, a shaft connected to said vertical axis, and a synchronous A.C. generator adapted so as to produce power relative to the rotational movement of said shaft.

5. The system of claim 4, said flyweel generator means, said first motor means, and said flywheel being arranged within a single housing about a common vertical shaft.

6. The system of claim 1, said first motor means comprising a three-phase A.C. induction motor.

7. The system of claim 1, said standby generator means comprising:

a standby generator; and a standby motor, said standby motor drivingly connected to said standby generator, said standby motor responsive to said standby generator upon interruptions in said source of power.

8. The system of claim 7, said standby motor being an internal combustion engine having an electric starter, said electric starter being connected to said standby motor, said electric starter responsive to interruptions in said source of power.

9. The system of claim 7, said standby generator comprising a three-phase synchronous A.C. generator, said standby generator responsive to the activating of said standby motor so as to generate electrical power and responsive to the said first motor means upon interruptions in said source of power.

10. The system of claim 1, said flywheel generator means further including a voltage regulator electrically connected about the output of said flywheel generator means for maintaining the desired voltage affecting said external load.

11. The system of claim 10, said output voltage from said flywheel generator being adjustable to the requirements of said external load.

12. The system of claim 1, said transfer controller responsive to restoration of power from said source of power, said transfer controller switchably causing said first motor means to receive power from said source of power, said transfer controller disconnecting said standby generator means upon said restoration of power.

13. An interruptible power system for supplying power to an electric load comprising:
   a flywheel generator means adapted to supply energy to said external load;
   a first motor means adapted to be connected to a source of power external to that of said power system, said first motor means acting on a shaft connected to said flywheel generator means, said first motor means for maintaining said flywheel generator means at a speed sufficient to power said external load;
   standby generator means adapted to supply energy to said first motor means;
   engine means drivingly connected to said standby generator means; and
   control means electrically connected to said source of power, to said first motor means, and to said standby generator means, said control means responsive to interruptions in said source of power for switching the sources of current.

14. The system of claim 13, said flywheel generator means and said first motor means being mechanically isolated from said standby generator means and said engine means.

15. The system of claim 13, said engine means being an internal combustion engine, said internal combustion engine coupled to said standby generator means.

16. The system of claim 13, said flywheel generator means further including a voltage regulator for controlling the voltage acting on said external load.

17. The system of claim 13, said engine means including an electric starter, said control means causing said electric starter to activate upon an interruption in said source of power.

18. A power system for maintaining electrical power to an uninterruptible load comprising:
   a flywheel generator electrically connected to said uninterruptible load, said uninterruptible load electrically isolated from other external sources of power;
   a motor arranged about said flywheel generator to maintain said flywheel generator at a speed synchronous with the requirements of said uninterruptible load, said motor adapted to be connected to a source of power external to said power system, said flywheel generator and said motor having a shaft arranged vertically therebetween, said motor acting on said shaft, said flywheel generator receiving said shaft so as to be responsive to the rotational movement of said shaft;
   a standby generator adapted to supply energy to said motor upon the occurrence of an interruption in said source of power, said energy being supplied electrically to said motor; and
   an internal combustion engine arranged so as to supply power to said standby generator, said internal combustion engine activated upon said occurrence of an interruption in said source of power.

19. The system of claim 18, said internal combustion engine and said standby generator being physically separated from said flywheel generator and said motor.

20. The system of claim 18, further comprising:
   electric control means switchably connected to said motor, said standby generator, and said internal combustion engine, said control means being responsive to interruptions in said source of power, said control means enabling said standby generator to act on said motor, said control means causing said internal combustion engine to activate.

* * * * *